United States Patent
Wu et al.

(10) Patent No.: US 8,856,441 B2
(45) Date of Patent: Oct. 7, 2014

(54) DYNAMIC HARD DISK MAPPING METHOD AND SERVER USING THE SAME

(75) Inventors: Chia-Ming Wu, Taipei (TW); Wen-Cheng Huang, Taipei (TW)

(73) Assignee: Inventec Corporation, Taipei (TW)

( * ) Notice: Subject to any disclaimer, the term of this patent is extended or adjusted under 35 U.S.C. 154(b) by 211 days.

(21) Appl. No.: 13/441,936

(22) Filed: Apr. 9, 2012

(65) Prior Publication Data

US 2013/0166840 A1    Jun. 27, 2013

(30) Foreign Application Priority Data

Dec. 26, 2011 (TW) .............................. 100148661 A (51) Int. Cl.
 *G06F 12/00* (2006.01)
(52) U.S. Cl.
 USPC ................... 711/114; 711/170; 711/E12.001; 711/E12.009
(58) Field of Classification Search
 CPC ..... G06F 9/5083; G06F 3/0689; G06F 3/061; G06F 11/0727; G06F 12/08
 USPC .................. 711/114, 170, E12.001, E12.009, 711/E12.019
 See application file for complete search history.

(56) References Cited

U.S. PATENT DOCUMENTS

2010/0287408 A1* 11/2010 Kopylovitz ....................... 714/6

* cited by examiner

*Primary Examiner* — Midys Rojas
(74) *Attorney, Agent, or Firm* — CKC & Partners Co., Ltd.

(57) ABSTRACT

A dynamic hard disk mapping method and a server using the same are disclosed. The server includes a first motherboard, a second motherboard, a first disk group corresponding to the first motherboard, and a second disk group corresponding to the second motherboard. In the dynamic hard disk mapping method, at first, a disk redistributing instruction is received and stored. Thereafter, a reset instruction is received and performed. Then, the number of hard disks of the first disk group and the number of hard disks of the second disk group are summed up to obtain a total hard disk number N, wherein N is a positive integer greater than zero. Thereafter, the disk redistributing instruction is read, and a redistribution computation is performed in accordance with the disk redistributing instruction to obtain a third disk group corresponding to the first motherboard and a fourth disk group corresponding to the second motherboard.

10 Claims, 13 Drawing Sheets

DYNAMIC HARD DISK MAPPING METHOD AND SERVER USING THE SAME

RELATED APPLICATIONS

This application claims priority to Taiwan Application Serial Number 100148661, filed Dec. 26, 2011, which is herein incorporated by reference.

BACKGROUND

1. Field of Invention

The disclosure relates to a dynamic hard disk mapping method and a server using the same. More particularly, the disclosure relates to a dynamic hard disk mapping method which can adjust a number of respective hard disks corresponding to multiple motherboards and a server using the same.

2. Description of Related Art

With rapid development of network technology, various novel network devices and information devices are successively developed to meet human demand. In these devices, a network server formed from redundant array of independent hard disks (RAID) is particularly important. The network server is directly connected to a network system, such that a remote computer device stores data into the network server or accesses data in the network server through this network system.

Figure 1:
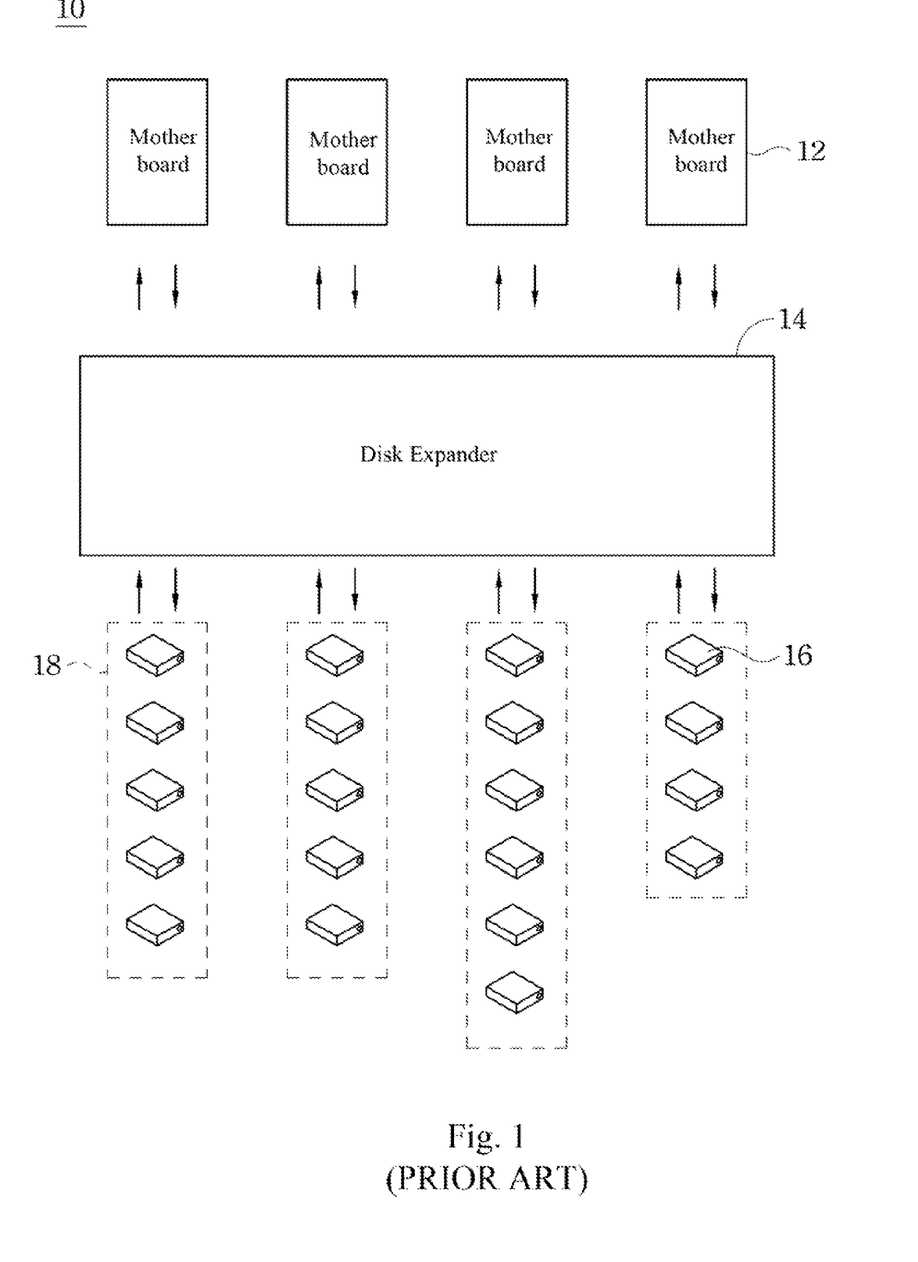
FIG. 1 illustrates a schematic functional block diagram showing a conventional server.

FIG. 1 illustrates a schematic functional block diagram showing a conventional server 10. The server 10 includes a plurality of motherboards 12, a disk expander 14 and a plurality of hard disks 16. It can be seen from FIG. 1 that, in order to provide a hard disk array with a large storage capacity, most of conventional servers use the disk expander 14 to implement connection among the plurality of hard disks 16, such that the server 10 has sufficient storage space to meet client's demands. The plurality of hard disks 16 are generally divided into a plurality of disk groups 18 in accordance with a predetermined grouping mode, and each of the disk groups 18 is corresponding to one of the plurality motherboards 12, so as to provide the storage space required for operating of the motherboards 12. The action of dividing the hard disks into the groups 18 and corresponding the groups 18 to the motherboards 12 is referred to as mapping.

Figure 1A:
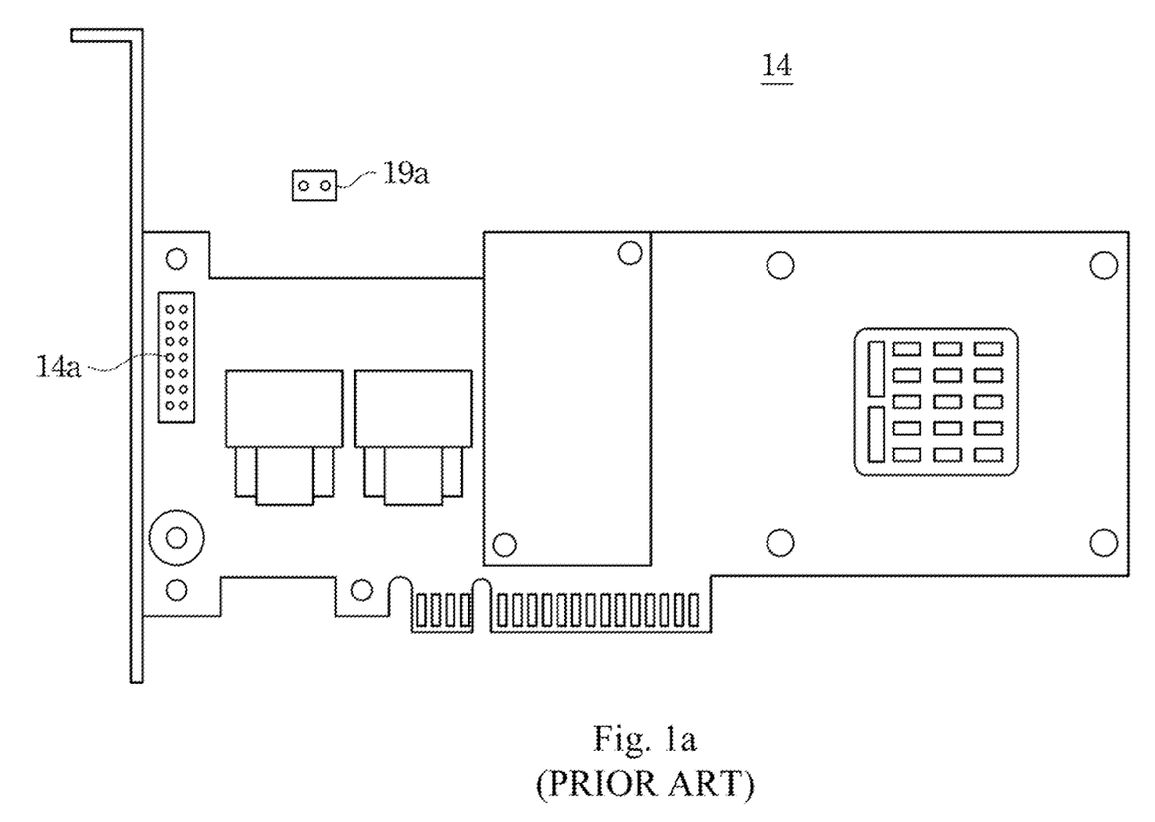
FIG. 1a illustrates a schematic structural view of a conventional disk expander and a jumper.
Figure 1B:
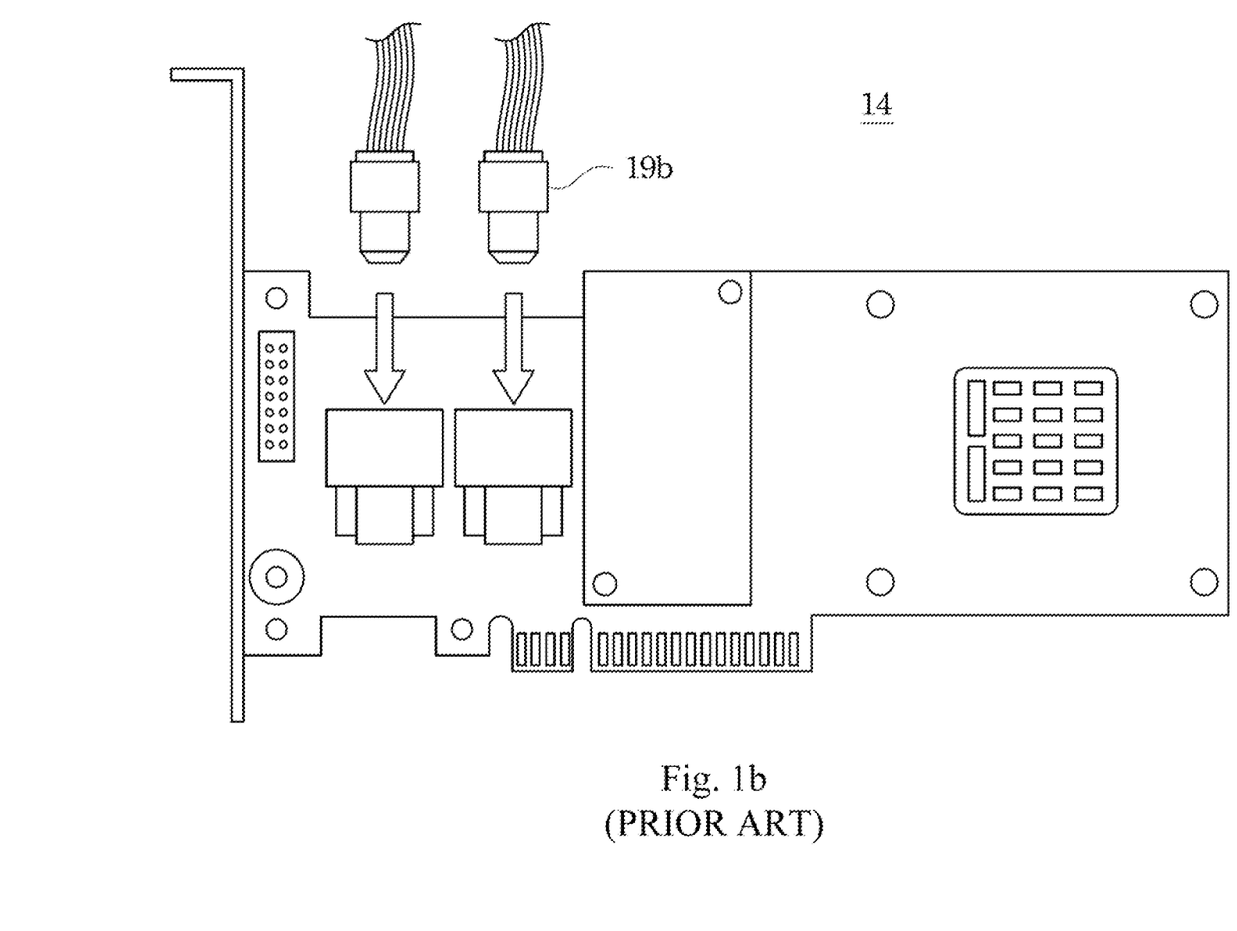
FIG. 1b illustrates a schematic structural view of a conventional disk expander and a special connection cable.

In order to set a number of hard disks 16 corresponding to each of the motherboards 12, a jumper or a special connection cable is often needed for setting. For example, as shown in FIG. 1a, the disk expander 14 has a plurality of setting pins 14a, and a user mounts a jumper 19a on two of the setting pins 14a in accordance with a required disk grouping mode, thereby short-circuiting the two pins. For another example, as shown in FIG. 1b, if the disk expander 14 is a serial attached SCSI (SAS), a SAS connection cable 19b is used for connecting the plurality of hard disks 16 with the disk expander 14, so as to set the number of the hard disks corresponding to each motherboard.

Since the method of setting the number of hard disks involves hardware architecture, each disk grouping mode is corresponding to a hardware setting value. If a user desires to expand the number of hard disks or change the number of the hard disks corresponding to each motherboard, the server has to be dismantled for resetting the jumper or reconnecting the cable.

Thus, there is a need to provide a novel disk mapping method and a server using the same for overcoming the disadvantages of the aforementioned conventional skill.

SUMMARY

An aspect of the present invention is to provide a dynamic hard disk mapping method and a server using the same. In the dynamic hard disk mapping method, a data storage module of a disk expander is used for storing a disk number correspondence table. Thus, the disk expander can read the disk number correspondence table from the data storage module. The aforementioned server uses the dynamic hard disk mapping method, such that, during resetting, the server can use the disk expander to read the number of hard disks from the data storage module and map the hard disks to the motherboards according to the disk number correspondence table.

According to an embodiment of the present invention, the dynamic hard disk mapping method is applicable to a server. The server includes a first motherboard, a second motherboard, a first disk group corresponding to the first motherboard, and a second disk group corresponding to the second motherboard. In the dynamic hard disk mapping method, at first, a disk redistributing instruction is received and stored. Thereafter, a reset instruction is received and executed. Then, a number of hard disks of the first disk group and a number of hard disks in the second disk group are summed up to obtain a total hard disk number N. Thereafter, the disk redistributing instruction is read, and a redistribution computation with respect to the total hard disk number N is performed in accordance with the disk redistributing instruction to obtain a third disk group corresponding to the first motherboard and a fourth disk group corresponding to the second motherboard. N is a positive integer greater than zero.

According to another embodiment of the present invention, the server includes a disk expander, a first motherboard, a second motherboard and N hard disks, where N is a positive integer greater than zero. The N hard disks are electrically coupled to the disk expander and are divided into the first disk group and the second disk group. The first motherboard is electrically coupled to the disk expander for controlling and accessing the first disk group. The second motherboard is electrically coupled to the disk expander for controlling and accessing the second disk group. When a disk redistributing instruction and a reset instruction are received by a first motherboard and the reset instruction is performed, the disk expander performs the redistribution computation with respect to the N hard disks to obtain and store the third disk group corresponding to the first motherboard and the fourth disk group corresponding to the second motherboard.

According to a further embodiment of the present invention, the server includes a disk expander, a first motherboard, a second motherboard and N hard disks, where N is a positive integer greater than zero. The N hard disks include a fifth disk group. The first motherboard is electrically coupled to the disk expander for controlling and accessing the fifth disk group. When the disk redistributing instruction and the reset instruction are received by the first motherboard and the reset instruction is performed, the disk expander performs the redistribution computation with respect to the N hard disks to obtain and store a sixth disk group corresponding to the first motherboard.

It can be known from the above description that, through the dynamic hard disk mapping method and the server provided by the embodiments of the present invention, a server manufacturer can write the required disk grouping mode into the storage module of the disk expander, such that the server manufacturer can obtain the required disk grouping mode without using a jumper or a connection cable.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 2:
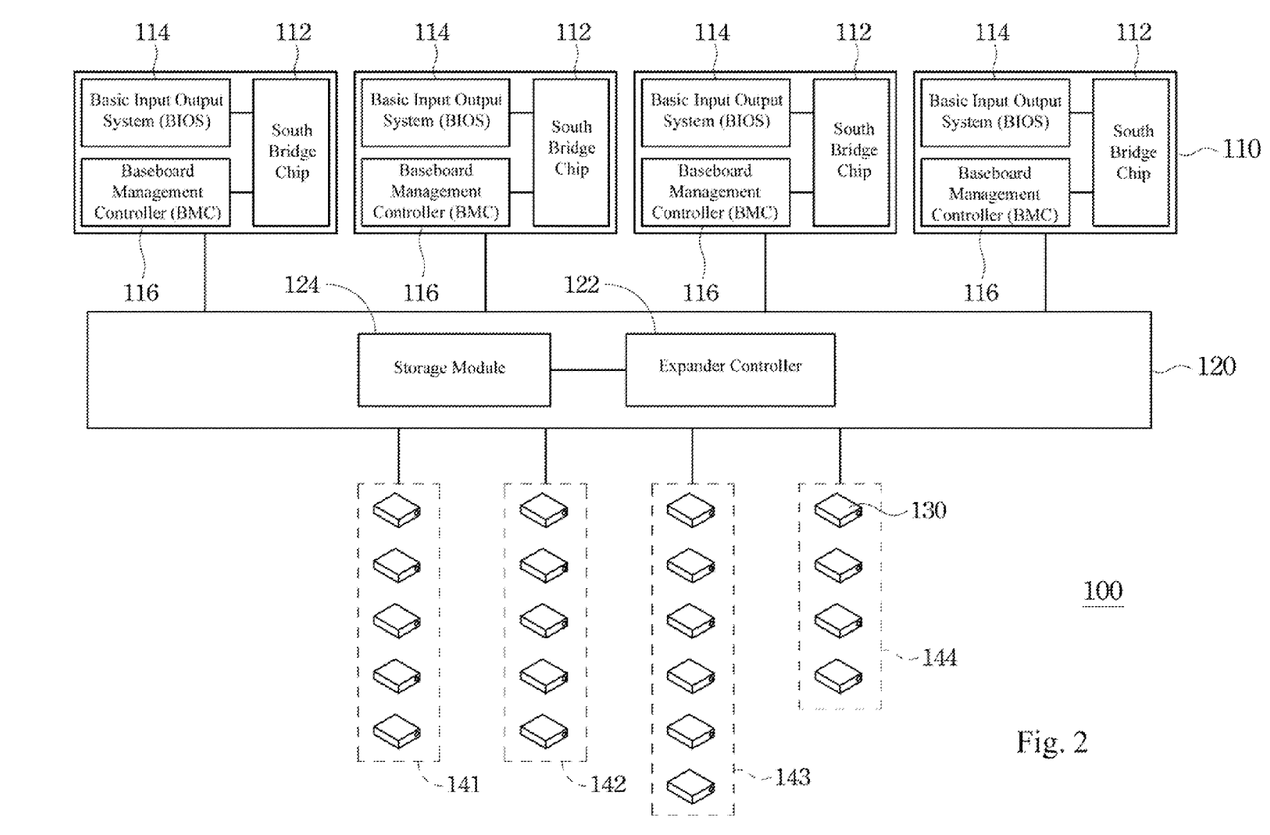
FIG. 2 illustrates a schematic functional block diagram of a server according to an embodiment of the present invention.

FIG. 2 illustrates a schematic functional block diagram of a server 100 according to an embodiment of the present invention. The server 100 includes a plurality of motherboards 110, at least one disk expander 120 and a plurality of hard disks 130. The disk expander 120 is electrically connected between the motherboards 110 and the plurality of hard disks 130, so as to divide the plurality of hard disks 130 into a plurality of disk groups 141-144 in accordance with the number of the plurality of motherboards 110, and to connect the disk groups 141-144 to the plurality of motherboards 110 in a one to one manner. In this embodiment, in a practical application, one or each of plurality of motherboards 110 can be regarded as a server in accordance with administrator's applications.

Each of the plurality of motherboards 110 includes a south bridge chip 112, a basic input output system (BIOS) 114 and a baseboard management controller (BMC) 116. The south bridge chip 112 is electrically coupled to the BIOS 114 and the BMC 116. In this embodiment, each of the plurality of motherboards 110 has a BMC 116, but embodiments of the present invention are not limited thereto. In other embodiments of the present invention, the server 100 may include only one BMC 116, and the plurality of motherboards 110 share the one BMC 116.

The disk expander 120 includes an expander controller 122 and a storage module 124. The storage module 124 stores a disk number correspondence table of the expander controller 122. The disk number correspondence table of the disk expander 120 stores the number of hard disks 130 corresponding to each motherboard 110. The expander controller 122 controls the disk expander 120 by using the disk number correspondence table stored in the storage module 124, so as to group and direct the hard disks 130 to the corresponding motherboards 110. The disk expander 120 may also, for example, include another storage module (not shown). The storage module 124 is used for storing a firmware code and an initial setting value (including the plurality of hard disks 130, the plurality of fans on the server and the like) required for operating the disk expander 120. The storage module 124 can be a flash read-only memory (ROM) or an electrically-erasable programmable read-only memory (EEPROM). In this embodiment, the reason for storing the plurality of hard disks 130 corresponding to each of the plurality of motherboards 110 in a storage module 124 and storing the firmware code and the initial setting value in the other storage module is to prevent the number correspondence table from being overwritten or erased while the firmware code is updated. However, if an area into which data cannot be written while the firmware code is being updated is configured in the storage module, the disk expander 120 may need only one storage module.

In this embodiment, the storage module 124 can be the flash ROM or the EEPROM, but embodiments of the present invention are not limited thereto. Additionally, in this embodiment, the disk expander 120 is a serial attached SCSI (SAS) expander, and the plurality of hard disks 130 is a small computer system interface (SCSI) hard disk, a SAS hard disk, an advanced technology attachment (ATA) hard disk or a serial advanced technology attachment (SATA) hard disk, but embodiments of the present invention are not limited thereto.

Additionally, it should be noted that, in another embodiment of the present invention, a fan control board (FCB) can be, for example, arranged between the plurality of motherboards 110 and the disk expander 120.

Figure 3:
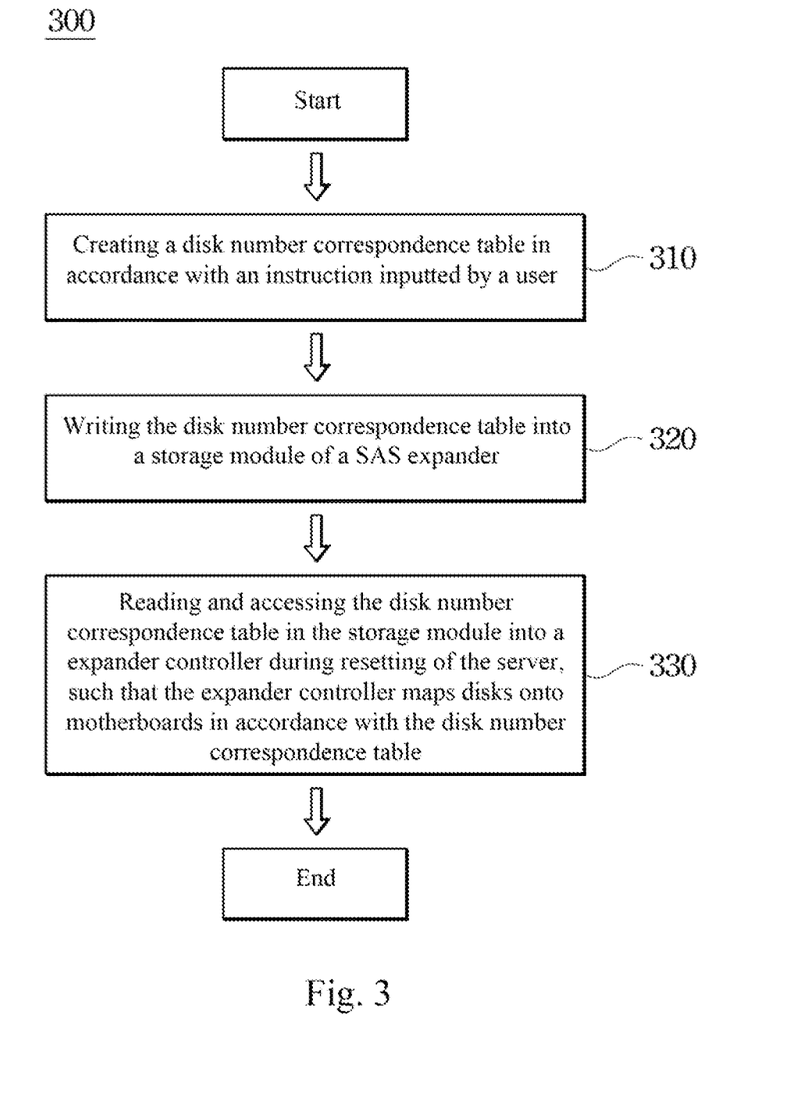
FIG. 3 illustrates a schematic flow chart showing a dynamic hard disk mapping method according to an embodiment of the present invention.

Referring to both FIG. 2 and FIG. 3, FIG. 3 illustrates a schematic flow chart showing a dynamic hard disk mapping method 300 according to an embodiment of the present invention. In the dynamic hard disk mapping method 300, at first, step 310 of creating a correspondence table is performed to create a disk number correspondence table in accordance with an instruction inputted by a user. In order to group the plurality of hard disks 130, the embodiment of the present invention provides a table filling tool for creating the number correspondence table. The user can use this table filling tool to fill the number of hard disks corresponding to each motherboard to create the number correspondence table in one of the motherboards 110 (i.e., a motherboard 110 set as a master control, wherein in a general blade server or server group, the administrator may set a server as the master control and meanwhile installs a server management software, so as to facilitate management of motherboards, hard disks or other peripheral devices).

Thereafter, a table writing-in step 320 is performed. The disk expander 120 receives and stores the disk redistributing instruction, wherein the disk redistributing instruction includes the disk number correspondence table. In the table writing-in step 320, the disk number correspondence table is written into the storage module 124 in the disk expander 120. For example, the disk number correspondence table is stored in the storage module.

Figure 3A:
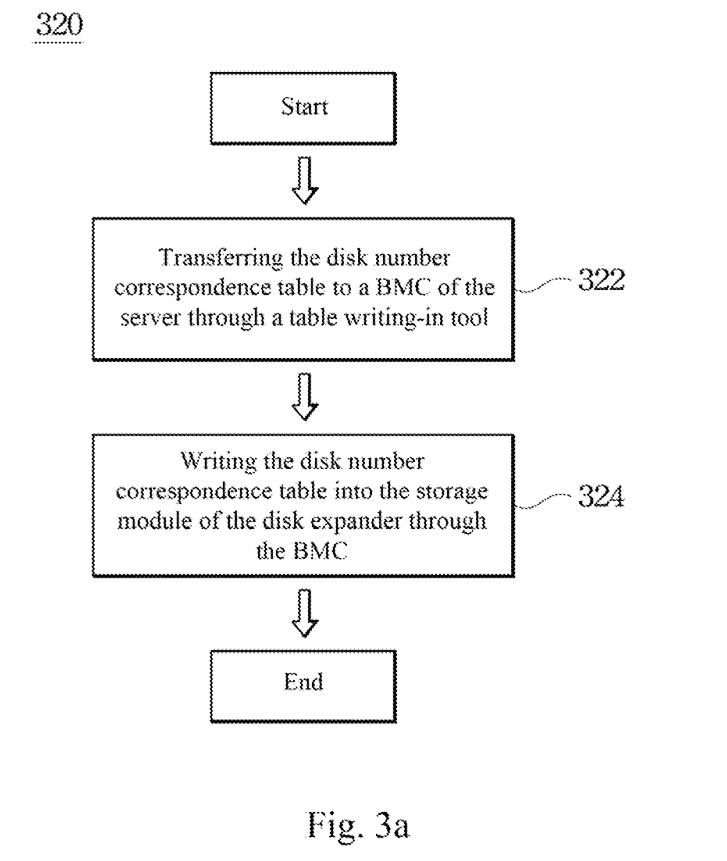
FIG. 3a illustrates a schematic flow chart showing a table writing-in step according to an embodiment of the present invention.
Figure 3B:
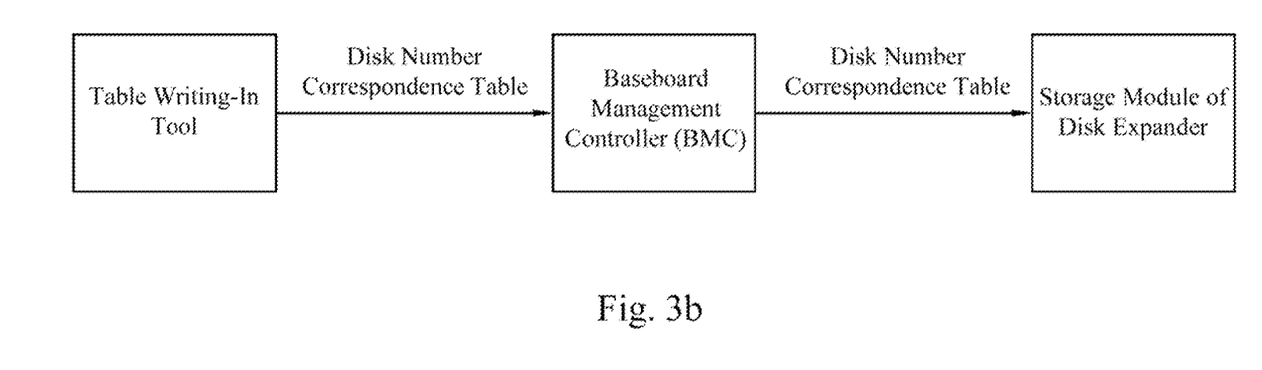
FIG. 3b illustrates a schematic view showing a transmitting process of a disk number correspondence table according to an embodiment of the present invention.

Referring to both FIG. 3a and FIG. 3b simultaneously, FIG. 3a illustrates a schematic flow chart showing the table writing-in step 320 according to an embodiment of the present invention, and FIG. 3b illustrates a schematic view showing a transmitting process of a disk number correspondence table according to an embodiment of the present invention. In the table writing-in step 320, at first, the data transmitting step 322 is performed to transmit the disk number correspondence table to the BMC 116 of the server 100 through a table writing-in tool. In this embodiment, the table writing-in tool is a program on a computer system.

However, in other embodiments of the present invention, may also be combined with the aforementioned table filling tool to form a combined program, such that the user can perform the step of table writing-in and table transmitting on the combined program.

Thereafter, a data writing-in step 324 is performed to transmit the disk number correspondence table to the expander controller 122 of the disk expander 120 through the BMC 116. In this embodiment, the operation condition of the server 100 is managed by the BMC 116, and thus the transmitting of the disk number correspondence table can be completed through the BMC 116. The BMC 116 of this embodiment uses an inter-integrated circuit ($I^2C$) transmit protocol to transmit the disk number correspondence table, but embodiments of the present invention are not limited thereto.

A resetting step 330 is performed after the table writing-in step 320, so as to receive and perform the reset instruction for resetting the server 100. In this embodiment, when the server 100 is reset, the expander controller 122 reads the disk number correspondence table in the storage module 124, such that the expander controller 122 can perform a mapping step in accordance with the disk number correspondence table, so as to map the plurality of hard disks 130 onto the motherboards 110.

Figure 3C:
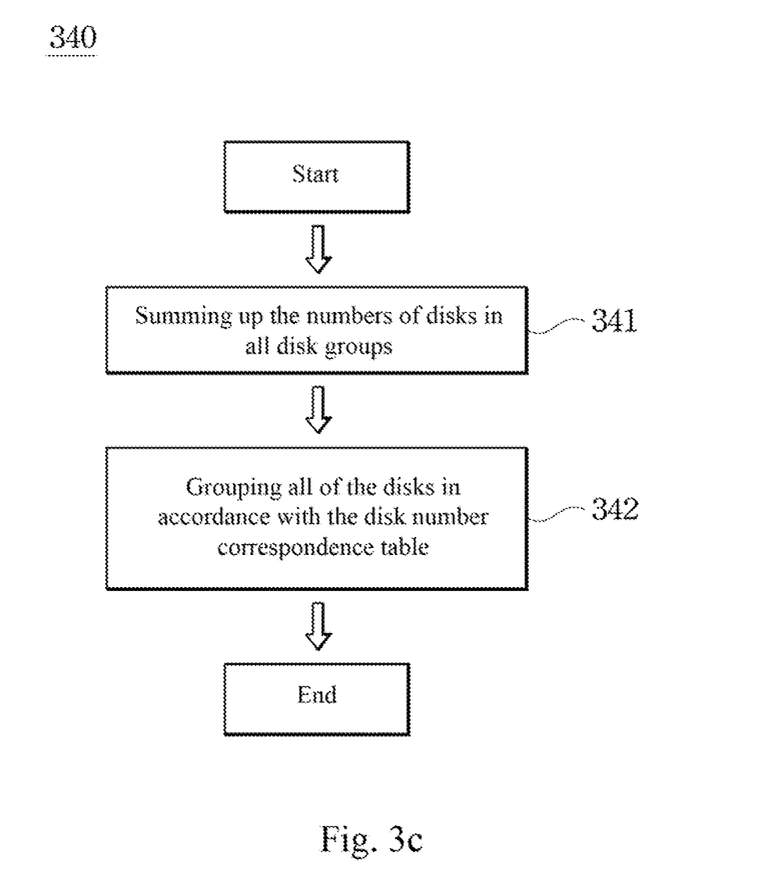
FIG. 3c illustrates a schematic flow chart showing a mapping step according to an embodiment of the present invention.

FIG. 3c illustrates a schematic flow chart showing a mapping step 340 according to an embodiment of the present invention. In the mapping step 340, at first a summing-up step 341 is performed for summing up the numbers of hard disks of the respective disk groups connected to the disk expander 120 to obtain the total hard disk number N, where N is a positive integer greater than zero. In this embodiment, N is 20, but embodiments of the present invention are not limited thereto. Thereafter, a redistributing step 342 is performed for performing a redistribution computation with respect to the total hard disk number N in accordance with the disk redistributing instruction, so as to change the number of hard disks corresponding to each motherboard 110. For example, in FIG. 2, the disk groups 141-144 include 5 hard disks, 5 hard disks, 6 hard disks and 4 hard disks respectively. After the redistributing step 342, the numbers of hard disks of the disk groups 141-144 may be changed to 4 hard disks, 6 hard disks, 4 hard disks and 6 hard disks respectively in accordance with user's requirements.

It can be known from the illustration above that, in this embodiment, the BMC is used for transmitting the disk number correspondence table to the storage module 124 stored in the disk expander 120, and when the server 100 is reset, the expander controller 122 of the disk expander 120 is used for reading the disk number correspondence table of the storage module 124. Thus, the disk expander 120 can map the plurality of hard disks 130 onto the plurality of motherboards 110 in correspondence with the contents of the disk number correspondence table and change the number of the hard disks included in the disk group corresponding to each motherboard.

In the dynamic hard disk mapping method 300 of this embodiment, the user can determine the number of hard disks corresponding to each motherboard in accordance with an actual requirement, without being limited to using a jumper and a special cable. Thus, the dynamic hard disk mapping method 300 and the server 100 can meet various user requirements in the aspect of disk grouping mode.

Figure 3D:
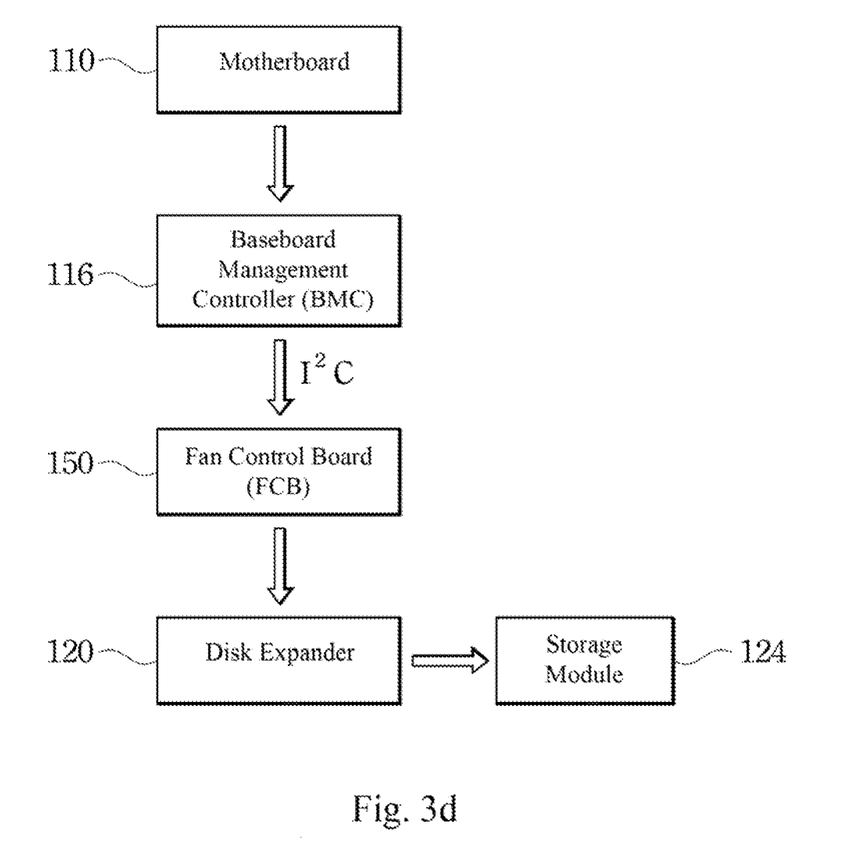
FIG. 3d illustrates a schematic view showing a transmitting process of a disk number correspondence table according to an embodiment of the present invention.

Additionally, in this embodiment, the BMC 116 may transmit the disk number correspondence table through the FCB 150, thereby allowing the disk expander 120 to write the disk number correspondence table into the storage module 124. In this embodiment, the FCB 150 is connected to the BMC 116 through the $I^2C$, as shown in FIG. 3d. However, in other embodiments of the present invention, the server may not have the FCB 150, or the FCB 150 may be replaced by an apparatus instead of the FCB, such as a power supply control board.

Figure 4:
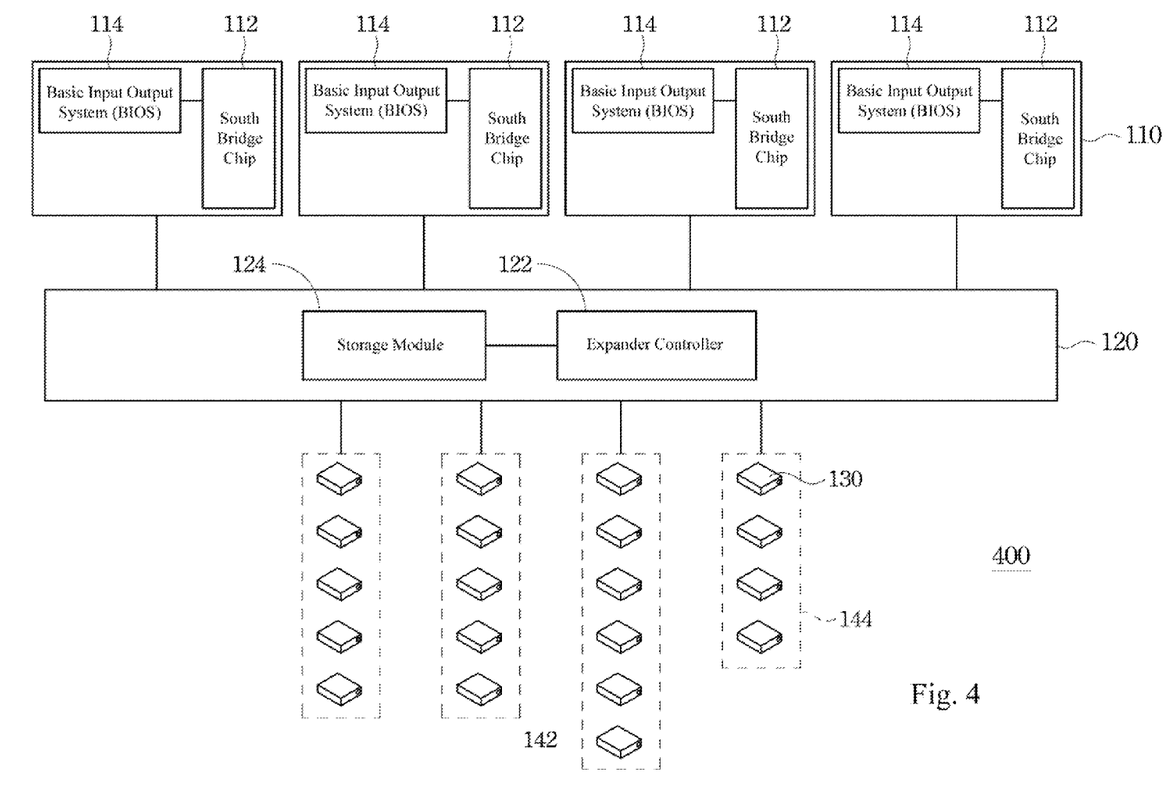
FIG. 4 illustrates a schematic functional block diagram showing a server according to another embodiment of the present invention.
Figure 5:
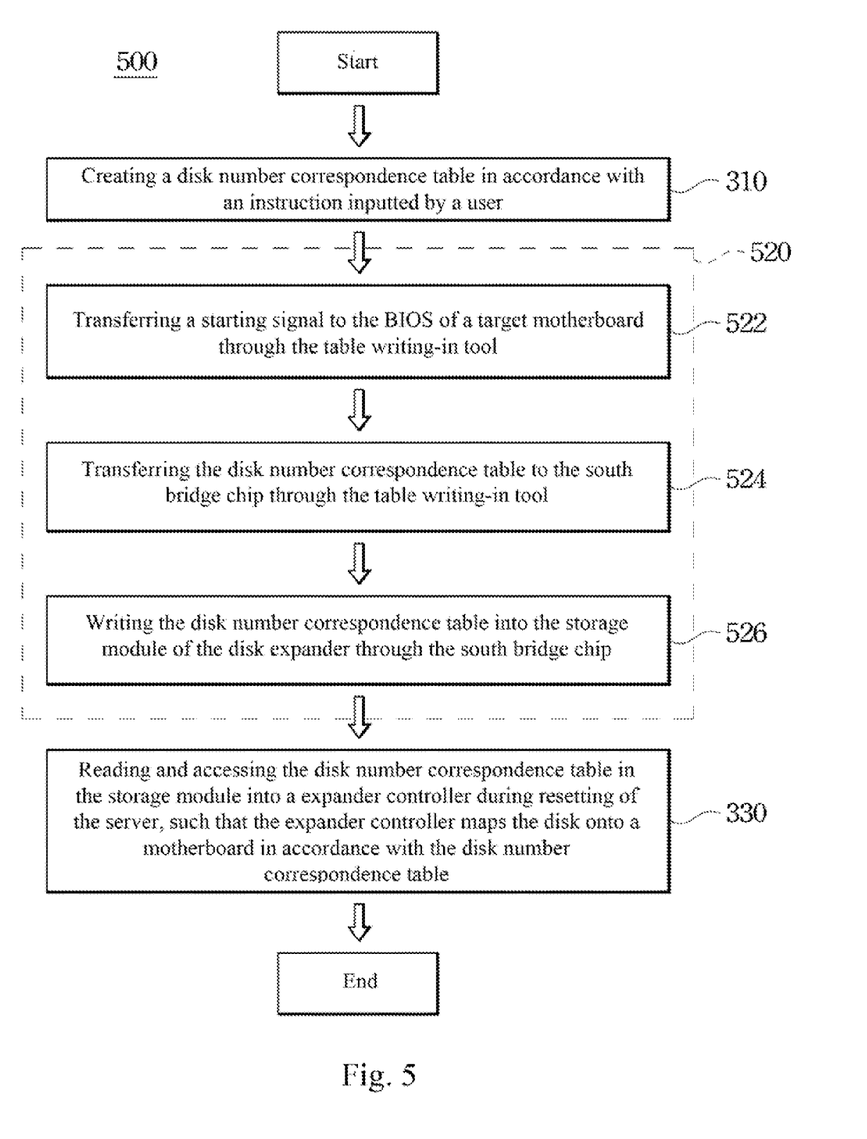
FIG. 5 illustrates a schematic flow chart showing a dynamic hard disk mapping method used by the server.

Referring to both FIGS. 4 and 5 simultaneously, FIG. 4 illustrates a schematic functional block diagram showing a server 400 according to another embodiment of the present invention, and FIG. 5 illustrates a schematic flow chart showing a dynamic hard disk mapping method 500 used by the server 400. The server 400 is similar to the server 100, and the difference between the servers 400 and 100 is that the server 400 does not include the BMC 116.

As illustrated in the above embodiments, the disk number correspondence table can be transmitted to the disk expander 120 through the BMC 116 of the server 400, and then be written into the storage module 124 through the expander controller 122 of the disk expander 120. However, if the server 400 does not have the BMC, the disk number correspondence table has to be transmitted to the disk expander 120 through other manners, and the dynamic hard disk mapping method 500 of this embodiment provides another manner for transmitting the disk number correspondence table.

The dynamic hard disk mapping method 500 is similar to the dynamic hard disk mapping method 300, and the difference between the dynamic hard disk mapping methods 500 and 300 is that, in the dynamic hard disk mapping method 500, a table writing step 520 replaces the table writing step 320 to transmit the redistributing instruction to the disk expander 120, thereby allowing the disk expander 120 to receive and store the redistributing instruction. In the table writing-in step 520, at first, a informing step 522 is performed to inform a basic input output system (BIOS) of one (a target motherboard) of the plurality of motherboards 110 (referred to as a master control hereinafter) through the table writing-in tool that the disk number correspondence table is about to be transmitted to the south bridge chip of the master control through the table writing-in tool.

In this embodiment, the table writing-in tool transmits a starting signal to the BIOS 114, and after the BIOS 114 receives the starting signal, the BIOS 114 informs the south bridge chip 112 of the master control (a target motherboard), such that the south bridge chip 112 is ready for receiving data by entering a data receiving state.

Figure 5A:
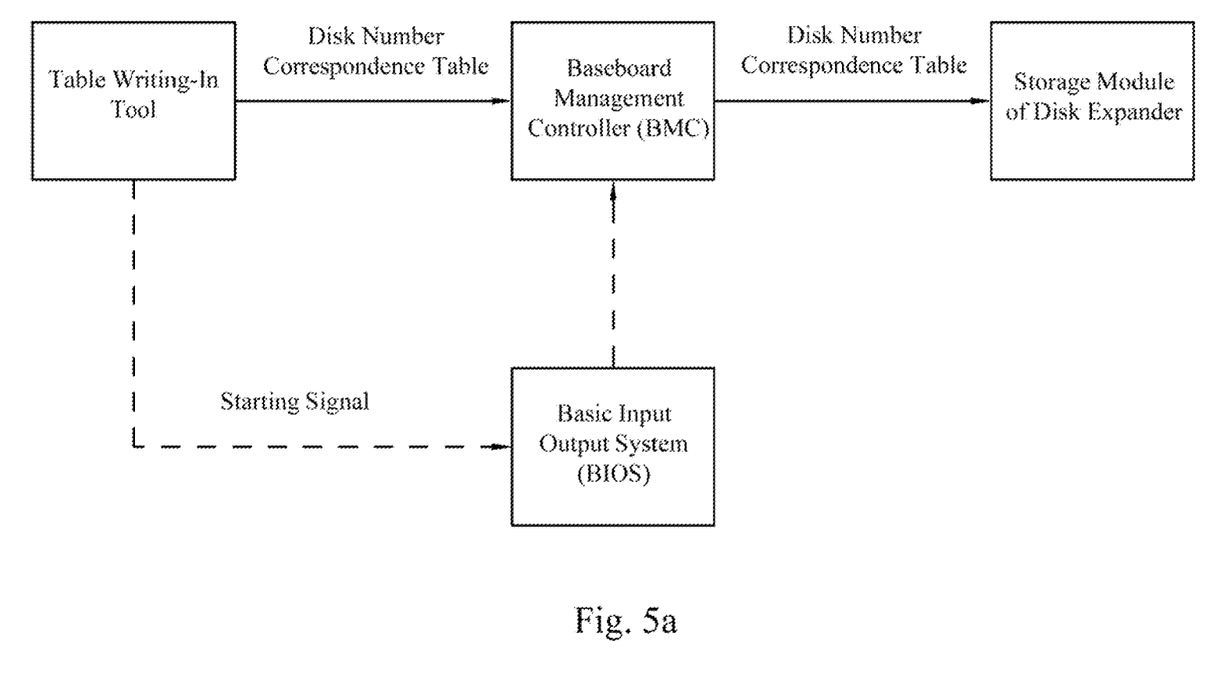
FIG. 5a illustrates a schematic view showing a transmitting process of a disk number correspondence table according to a further embodiment of the present invention.

After the informing step 522, a data transmitting step 524 is performed to transmit the redistributing instruction including the disk number correspondence table to the south bridge chip 112 of the master control through the table writing-in tool. Subsequently, a data writing-in step 526 is performed to transmit the disk number correspondence table to the expander controller 122 of the disk expander 120 by using the south bridge chip 112, such that the disk expander 120 writes the disk number correspondence table into the storage module 124, and thus the server 400 can rearrange the corresponding relationship between each of the plurality of motherboards 110 and the plurality of hard disks 130 after resetting. That is, the number of the hard disks 130 which can be accessed by each motherboard 110 is redistributed. The transmitting process of the disk number correspondence table of this embodiment is illustrated in FIG. 5a.

It can be known from the above illustration that, in the dynamic hard disk mapping method 500 of this embodiment, the disk number correspondence table is transmitted to the disk expander 120 by using the south bridge chip of the motherboard 110, such that the server 400 can transmit the disk number correspondence table to the expander controller 122 of the disk expander 120 without using the BMC.

Figure 6:
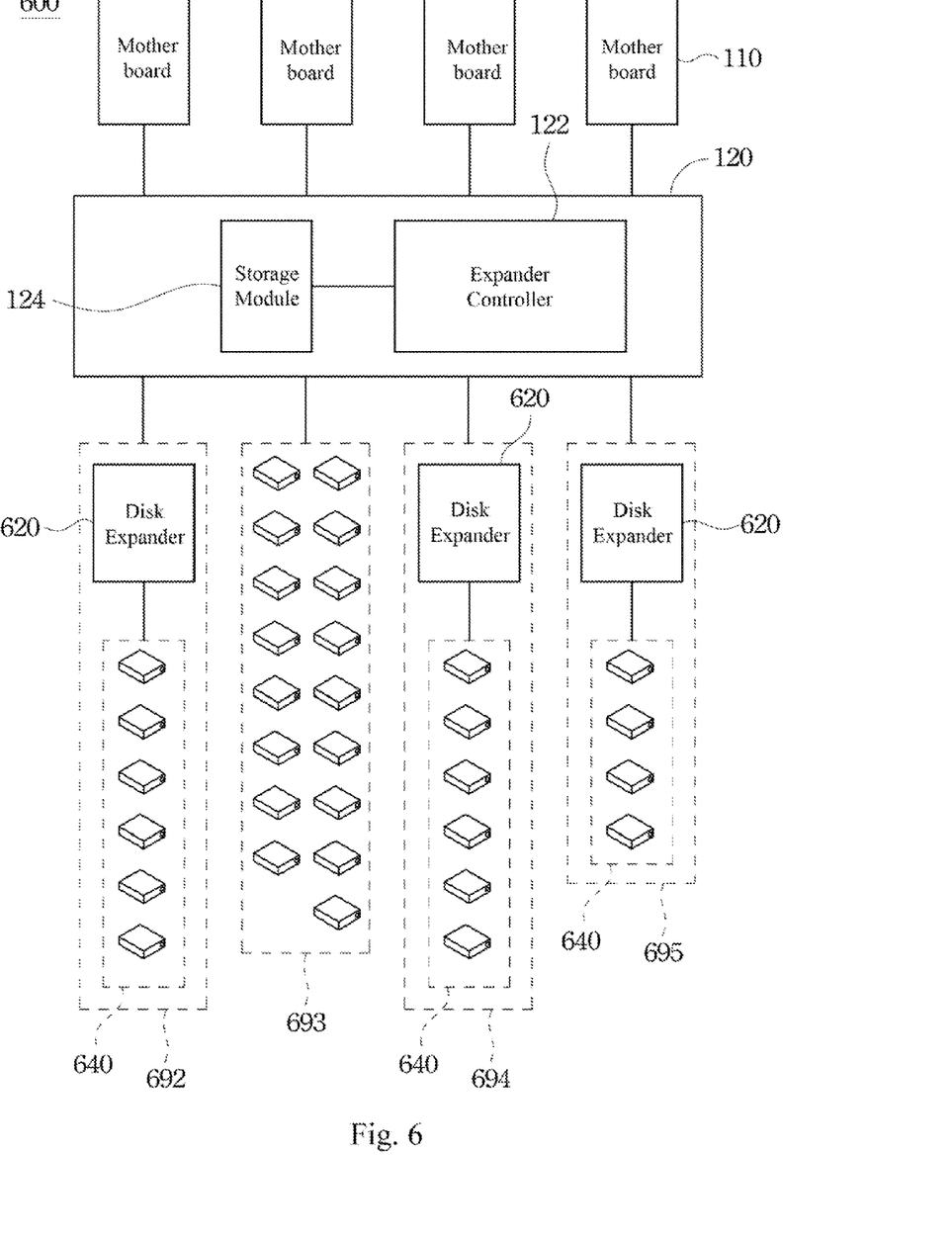
FIG. 6 illustrates a schematic functional block diagram showing a server according to yet embodiment of the present invention.

FIG. 6 illustrates a schematic functional block diagram showing a server 600 according to a further embodiment of the present invention. The server 600 is similar to the server 100, and the difference between the servers 600 and 100 is that the serve 600 may include additional disk expanders 620. In the following description, the disk expander 120 (the upper layer expander) is referred to as a main expander, and the disk expanders 620 are referred to as assistant expanders.

In general, the plurality of hard disks 130 which can be connected to the disk expander 120 is limited. In order to further increase the data storage space of the server, in this embodiment, the assistant expanders 620 are used for connecting more hard disks 130 to the plurality of motherboards 110. For example, in this embodiment, one assistant expander 620 is electrically connected between a disk group 640 and the main expander 120. Since one assistant expander 620 only occupies one connection address of the main expander 120, the main expander 120 can be connected to more hard disks 130 through the assistant expander 620.

In this embodiment, the main expander 120 and the assistant expanders 620 may be SAS expanders, and the plurality of hard disks 130 can be SAS hard disks or hard disks of another type. If the plurality of hard disks 130 are SAS hard disks, the main expander 120 can identify the hard disks by using the SAS addresses disposed in the SAS hard disks, where the SAS addresses are assigned by the manufacturer during manufacturing. If the plurality of hard disks 130 are not a SAS hard disk, since the plurality of hard disks 130 itself has no address, the address is set in accordance with the hard disks adjacent to the hard disk 130. For example, if one of the plurality of the hard disks 130 itself has no address and another one of the plurality of hard disks 130 adjacent to the one of the plurality of the hard disks 130 is a SAS hard disk, then based on the SAS address of the another one of the plurality of hard disks 130, the disk address of the one of the plurality of hard disks 130 which itself has no address can be the value of the SAS address of the another one of the plurality of hard disks 130 plus 1. To the method of the SAS address plus 1 is merely an example for illustration, and embodiments of the present invention are not limited thereto. If the first one of the plurality of hard disks 130 is a SAS disk, and the second one and third one of the plurality of hard disks 130 (having no disk address) are not SAS hard disks, then the disk address of the second the second one of the plurality of hard disks 130 can be the value of the disk address of the first one of the plurality of SAS hard disk plus 1, and the disk address of the third one of the plurality of hard disks 130 can be the value of the disk address of the first SAS hard disk plus 2.

Additionally, when the first one of the plurality of hard disks 130 (having no disk address) is not a SAS hard disk and the second one of the plurality of disks 130 is a SAS hard disk, the disk address of the first one of the plurality of hard disks 130 can be the value of the disk address of the second one of the plurality of hard disks 130 minus 1.

Additionally, it should be noted that although the server 600 of this embodiment includes a plurality of disk expanders 620, yet in order to manage the plurality of hard disks 130 conveniently by the administrator, the disk number correspondence table is stored in the storage module 124 of the main expander 120.

In this embodiment, the main expander 120 divides the plurality of hard disks 130 connected to the main expander 120 and the plurality of hard disks 130 connected to the assistant expander 620 into disk groups 692-695. The disk groups 692, 694 and 695 includes the assistant expander 620, such that the disk group 640 is electrically connected to the main expander 120 through the assistant expander 620, while the plurality of hard disks 130 of the disk group 693 are electrically connected to the main expander 120 without using the assistant expander 620.

In view of the above, in the present invention, the number of hard disks corresponding to each motherboard is redistributed during the starting-up process of the system. Thus, the manager can distribute the disk space easily without using any jumper or special cable for connection.

Although the present invention has been disclosed with reference to the above embodiments, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. A dynamic hard disk mapping method, applicable to a server comprising a first motherboard, a second motherboard, a first disk group corresponding to the first motherboard, and a second disk group corresponding to the second motherboard, the dynamic hard disk mapping method comprising;
   receiving and storing a disk redistributing instruction;
   receiving and performing a reset instruction;
   summing up a number of hard disks of the first disk group and a number of hard disks of the second disk group to obtain a total hard disk number N; and
   reading the disk redistributing instruction and performing a redistribution computation with respect to the total hard disk number N in accordance with the disk redistributing instruction, so as to obtain and store a third disk group corresponding to the first motherboard and a fourth disk group corresponding to the second motherboard;
   wherein N is a positive integer greater than zero.

2. The dynamic hard disk mapping method of claim 1, wherein a number of hard disks of the third disk group is different from the number of hard disks of the first disk group, and a number of hard disks of the fourth disk group is different from the number of hard disks of the second disk group.

3. The dynamic hard disk mapping method of claim 1, wherein the step of reading the disk redistributing instruction and performing the redistribution computation with respect to the total hard disk number N in accordance with the disk redistributing instruction comprises:
   reading the disk redistributing instruction;
   determining whether each of the hard disks of the first disk group and the second disk group has an address;
   using the address of the $(M-1)^{th}$ hard disk plus 1 as an address of the $M^{th}$ disk when it is determined that the $M^{th}$ hard disk does not have an address;
   distributing the total hard disk number N of hard disks in accordance with the disk redistributing instruction;
   transmitting the address of each of the hard disks of the third disk group to the first motherboard; and transmitting the address of each of the hard disks of the fourth disk group to the second motherboard;

wherein M is a positive integer less than or equal to N.

4. A server, comprising:

a disk expander;

N hard disks electrically coupled to the disk expander and divided into a first disk group and a second disk group;

a first motherboard electrically coupled to the disk expander for controlling and accessing the first disk group; and a second motherboard electrically coupled to the disk expander for controlling and accessing to the second disk group;

wherein, when a disk redistributing instruction and a reset instruction are received by the first motherboard, and the reset instruction is performed, the disk expander performs a redistribution computation with respect to the N hard disks to obtain and store a third disk group corresponding to the first motherboard and a fourth disk group corresponding to the second motherboard, wherein N is a positive integer greater than zero.

5. The server of claim 4, wherein a number of hard disks of the third disk group is different from the number of hard disks of the first disk group, and a number of hard disks of the fourth disk group is different from the number of hard disks of the second disk group.

6. The server of claim 4, wherein the disk expander determines whether each hard disk of the first disk group and the second disk group has an address, and if it is determined that the $M^{th}$ hard disk does not have an address, the address of the Mth hard disk is a value of the address of the $(M-1)^{th}$ hard disk plus 1, and the N hard disks are distributed in accordance with the disk redistributing instruction, so as to transmit the address of each hard disk in the third disk group to the first motherboard and transmit the address of each hard disk of the fourth disk group to the second motherboard, wherein M is a positive integer which is less than or equal to N.

7. The server of claim 4, further comprising: a storage module electrically coupled to the disk expander for storing the number of hard disks of the first disk group, the number of hard disks of the second disk group, the number of hard disks of the third disk group and the number of hard disks of the fourth disk group, as well as the disk redistributing instruction.

8. A server, comprising:

a disk expander;

N hard disks comprising a fifth disk group;

a first motherboard electrically coupled to the disk expander for controlling and accessing the fifth disk group; and wherein, when a disk redistributing instruction and a reset instruction are received by the first motherboard and the reset instruction is performed, the disk expander performs a redistribution computation with respect: to the N hard disks to obtain and store a sixth disk group corresponding to the first motherboard.

9. The server of claim 8, wherein a number of hard disks in the sixth disk group is different from a number of hard disks in the filth disk group.

10. The server of claim 8, further comprising; a storage module electrically coupled to the disk expander for storing the number of hard disks of the fifth disk group and the number of hard disks of the sixth disk group, as well as the disk redistributing instruction.

* * * * *